May 31, 1949.    O. H. SCHMITT    2,471,705
VARIABLE REACTOR
Filed Aug. 13, 1946

INVENTOR.
Otto H. Schmitt
BY
ATTORNEY

Patented May 31, 1949

2,471,705

UNITED STATES PATENT OFFICE 2,471,705

VARIABLE REACTOR

Otto H. Schmitt, Mineola, N. Y., assignor to the United States of America as represented by the Secretary of the Navy Application August 13, 1946, Serial No. 690,309

6 Claims. (Cl. 250—40)

The present invention relates to reactors. The broad object is to provide a novel wide-range reactor primarily useful in the 100–1000 megacycle per second or higher ranges.

In "The General Radio Experimentor" of October 1944, an article on the "Butterfly circuit," by Edward Karplus, and also in the "Proceedings of the IRE," January 1945, pages 426–441, there is discussed a type of variable reactor or wide-range tuning circuit for high frequencies. According to the latter article, "The common features that distinguish them from coil-capacitor combinations are that the inductive element of a parallel tuned circuit is built integrally with the capacitive element and that the two terminals are accessible that subtend a maximum of the total tuned circuit impedance." From all that has been written on the subject, there appears to be no indication that circuits subtending a minimum of total tuned circuit impedance have been devised. A further object of the present invention, therefore, is to provide a series tuned circuit in which the inductive and capacitive elements are integrally associated for a minimum of impedance between two terminals. A further object is to provide such a variable reactor wherein no slide or flexible connection is required.

The present invention proposes an arcuate inductor strip, left open at one terminal and connected at only the other terminal to a capacitor plate. A second capacitor plate insulated from the first and from the inductor is movable relative to said inductor strip and said first capacitor plate. These components are symmetrically duplicated. In this arrangement, the open inductor terminals constitute the terminals of a wide-range, high-frequency, series-tuned reactor which requires no sliding or flexible contact to the adjustable component.

The invention will be better understood from the following detailed disclosure in which.

Figure 1:
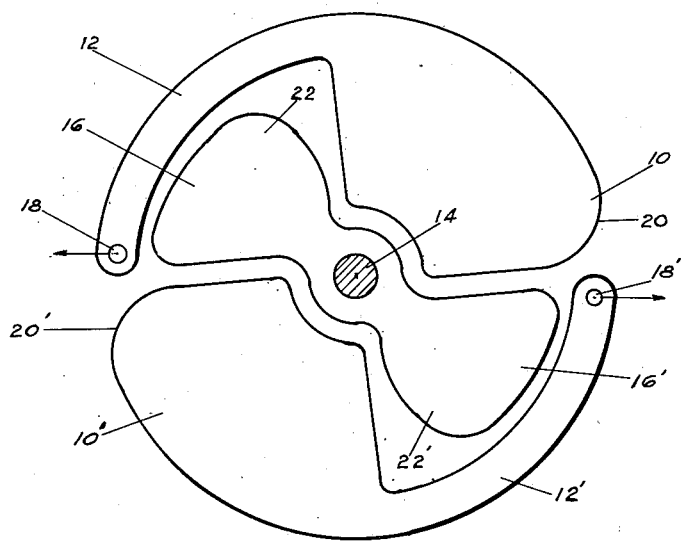
Fig. 1 is the front view of a specific embodiment thereof.
Figure 2:
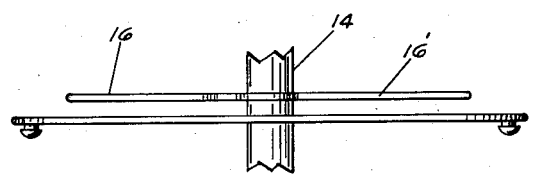
Fig. 2 is a plan view.

In Fig. 1, a pair of sector-shaped capacitor plates 10, 10' are constructed integrally with arcuate strips 12, 12' which constitute inductors. On a shaft 14 there is mounted a pair of capacitor plates 16 and 16' that are connected to each other about shaft 14. Advantageously, an open terminal 18' of inductor 12' is appreciably spaced from the adjacent capacitor plate 10 for a minimum of capacitance, by suitably curvedly forming that plate 10 at corner 20. Capacitor plate 10' is similarly curvedly shaped at 20' for the same purpose. The leading edges 22, 22' of plates 16 and 16', respectively, are shaped to afford a minimum of capacitance between plates 16, 16' and the remainder of the variable reactor when those plates are in the extreme position shown. The shape of the capacitor must also take into account the manner of resonant frequency variation as plates 16, 16' are moved into opposition with plates 10, 10'. The design should also avoid the possibility of parasitic resonances other than that intended.

In the position shown in the drawing, the effect of plates 16 and 16' in the edge-to-edge relation with inductors 12 and 12' is to reduce their effective inductance. Since the capacitance is also at a minimum in this relative position, the resonant frequency of the unit between terminals 18 and 18' is high. When plates 16 and 16' are moved opposite plates 10 and 10', respectively, the full effect of strips 12 and 12' as inductors is realized and there is a maximum of capacity of plates 10 to 16 connected in series with capacitor plates 16' to 10'. In that position of adjustment, the resonant frequency is relatively low. In any position of adjustment the impedance is low and resistive at the resonant frequency, but high and reactive at frequencies above and below resonance.

Such series resonant units are primarily useful in the frequency range of approximately 100–1000 megacycles per second or higher, for line termination, filter networks, and in all of the high-frequency analogies where ordinary series circuits of lumped inductance and capacitance have heretofore been used at lower frequencies.

It is not necessary that the assembly be flat; for analogously to the Karplus discussion of parallel tuned circuits, the capacitor plates may well be made cylindrical. Furthermore, whether the assemblies are flat or curved, the relative motion might be along an axis or in a straight line (rather than about an axis as shown) provided that the inductors are arranged to extend in a like direction from the capacitor portions (rather than in the opposite directions shown). It is also within the scope of the present invention to use multiple plates 10 and 16 in the conventional, alternating-plate arrangement of variable capacitors.

What is claimed is:

1. A variable reactor comprising a pair of first capacitor surfaces, separate inductor strips connected at one terminal to respective ones of said capacitor surfaces, the other terminal of each said strip being spaced from the capacitor surface to which the other strip is connected, and a second capacitor plate optionally positionable in face-to-face opposition to said first surfaces or in approximate edge-to-edge opposition to said strips, or in any proportions of opposition to said plates and said strips, the other terminals of said strips constituting the terminals of said reactor.

2. The reactor defined as in claim 1 wherein said other terminals of said inductor strips are rounded, thereby to minimize abrupt discontinuities.

3. The reactor defined as in claim 1 wherein the parts of said first capacitor surfaces adjacent said other terminals are rounded, thereby to minimize abrupt discontinuities.

4. The reactor defined in claim 1 wherein said other terminals of said strips and the adjacent parts of said first capacitor surfaces are oppositely curved, thereby to minimize capacitance therebetween.

5. Ultra-high-frequency circuit apparatus comprising first and second stator condenser plates of substantially quadrantal shape and disposed in alternate quadrants of a circle, arcuate projections at the peripheral portions of said plates, said projections being disposed in the other quadrants of said circle and extending toward and terminating in spaced relation to said plates, and a rotor condenser element adjustably mounted at said center and having oppositely extending plates operable to define with said first and second plates and said projections a circuit having variable capacitance and inductance.

6. The apparatus defined in claim 5 wherein said rotor plates having leading edges curvedly formed, whereby in minimum capacitance position thereof, the capacitance value is substantially reduced.

OTTO H. SCHMITT.

REFERENCES CITED

The following references are of record in the file of this patent:

UNITED STATES PATENTS

| Number | Name | Date |
| --- | --- | --- |
| 2,367,681 | Karplus et al. | Jan. 23, 1945 |